United States Patent
Fukunaga et al.

(10) Patent No.: US 8,350,441 B2
(45) Date of Patent: Jan. 8, 2013

(54) MOTOR INCLUDING WIRES WITH INSULATING TUBES AND METHOD OF MANUFACTURING MOTOR

(75) Inventors: Keisuke Fukunaga, Kyoto (JP); Motofumi Otsuji, Kyoto (JP); Masato Aono, Kyoto (JP)

(73) Assignee: Nidec Corporation, Kyoto (JP)

( * ) Notice: Subject to any disclaimer, the term of this patent is extended or adjusted under 35 U.S.C. 154(b) by 292 days.

(21) Appl. No.: 12/845,824

(22) Filed: Jul. 29, 2010

(65) Prior Publication Data

US 2011/0025148 A1 Feb. 3, 2011

(30) Foreign Application Priority Data

Jul. 30, 2009 (JP) ................................ 2009-177812

(51) Int. Cl.
*H02K 1/12* (2006.01)
*H02K 3/38* (2006.01)
(52) U.S. Cl. 310/254.1; 310/71; 310/194; 310/216.079; 29/596; 29/605
(58) Field of Classification Search .................. 310/260, 310/71, 194, 216.079, 254.1; 29/596, 606, 29/605; *H02K 1/12, 3/38*
See application file for complete search history.

(56) References Cited

U.S. PATENT DOCUMENTS

| | | | | |
|---|---|---|---|---|
| 3,457,442 A | * | 7/1969 | Crites et al. | 310/71 |
| 3,912,957 A | * | 10/1975 | Reynolds | 310/71 |
| 4,227,106 A | * | 10/1980 | Druss et al. | 310/184 |
| 4,287,446 A | * | 9/1981 | Lill et al. | 310/71 |
| 4,856,180 A | * | 8/1989 | Barrett et al. | 29/596 |
| 6,181,531 B1 | * | 1/2001 | Koshikawa et al. | 360/294.4 |
| 6,531,797 B2 | * | 3/2003 | Eydelie et al. | 310/71 |
| 6,617,725 B2 | * | 9/2003 | Rose, Sr. | 310/74 |
| 6,941,644 B2 | * | 9/2005 | Shteynberg et al. | 29/605 |
| 7,650,682 B2 | * | 1/2010 | Sugishima et al. | 29/596 |
| 2004/0070293 A1 | * | 4/2004 | Kabasawa et al. | 310/71 |
| 2009/0102310 A1 | * | 4/2009 | Amano | 310/215 |
| 2011/0025148 A1 | * | 2/2011 | Fukunaga et al. | 310/71 |

FOREIGN PATENT DOCUMENTS

| | | | |
|---|---|---|---|
| JP | 61227648 | * | 10/1986 |
| JP | 05-030695 A | | 2/1993 |
| JP | 10-136601 A | | 5/1998 |
| JP | 11089152 | * | 3/1999 |
| JP | 2002034190 | * | 1/2002 |

OTHER PUBLICATIONS

Machine translation of JP 11-089152, Mar. 30, 1999, Koichi Uchida, "Stator, and Motor Using the Stator".*
Machine Translation of JP 20020-341190, Jan. 31, 2002, Yamamoto et al., "Rotating Machine".*

* cited by examiner

*Primary Examiner* — John K Kim
(74) *Attorney, Agent, or Firm* — Keating & Bennett, LLP (57) ABSTRACT

A motor includes a shaft, a rotor, a stator, and a housing. The stator preferably includes a core including a plurality of teeth, a plurality of coils, and electrically insulating tubes. The core is defined by a combination of a plurality of unit cores each of which has a separate one of the teeth. The plurality of coils include two or more continuous coils defined by a single line of a conductor wire. Each of the electrically insulating tubes is arranged to cover at least a portion of the conductor wire which passes between the continuous coils.

8 Claims, 9 Drawing Sheets

MOTOR INCLUDING WIRES WITH INSULATING TUBES AND METHOD OF MANUFACTURING MOTOR

BACKGROUND OF THE INVENTION

1. Field of the Invention

The present invention relates to a motor and a method of manufacturing the motor. In particular, the present invention relates to a structure arranged to provide electrical insulation for a portion of a conductor wire which passes between coils.

2. Description of the Related Art

Regarding a conventional structure for insulation of the conductor wire, JP-A 5-30695, for example, describes a technique of winding a tape on a surface of a coil conductor (i.e., the conductor wire) and thereafter impregnating it with a thermosetting resin to form an insulating layer.

Meanwhile, JP-A 10-136601 describes a technique of covering a lead wire (i.e., the conductor wire) with an insulating tube. The insulating tube is formed by rolling an insulating film into a spiral shape and subjecting the rolled film to an ultrasonic sealing process or the like, so that the film has a tubular shape.

SUMMARY OF THE INVENTION

A motor according to a preferred embodiment of the present invention include a shaft, a rotor, a stator, and a housing. The stator preferably includes a core including a plurality of teeth, a plurality of coils, and electrically insulating tubes. The core is defined by a combination of a plurality of unit cores, each of which has a separate one of the teeth. The plurality of coils preferably include two or more continuous coils each defined by a single line of a conductor wire. Each of the electrically insulating tubes is arranged to cover at least a portion of the conductor wire which passes between the continuous coils.

In accordance with the motor according to a preferred embodiment of the present invention, it is possible to ensure electrical insulation between the portion of the conductor wire which passes between the continuous coils and any other component of the motor with high reliability.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described in detail with reference to the accompanying drawings. Note that the following description is in all aspects illustrative and not restrictive, and should not be construed to restrict the applications or uses of the present invention in any manner.

Figure 1:
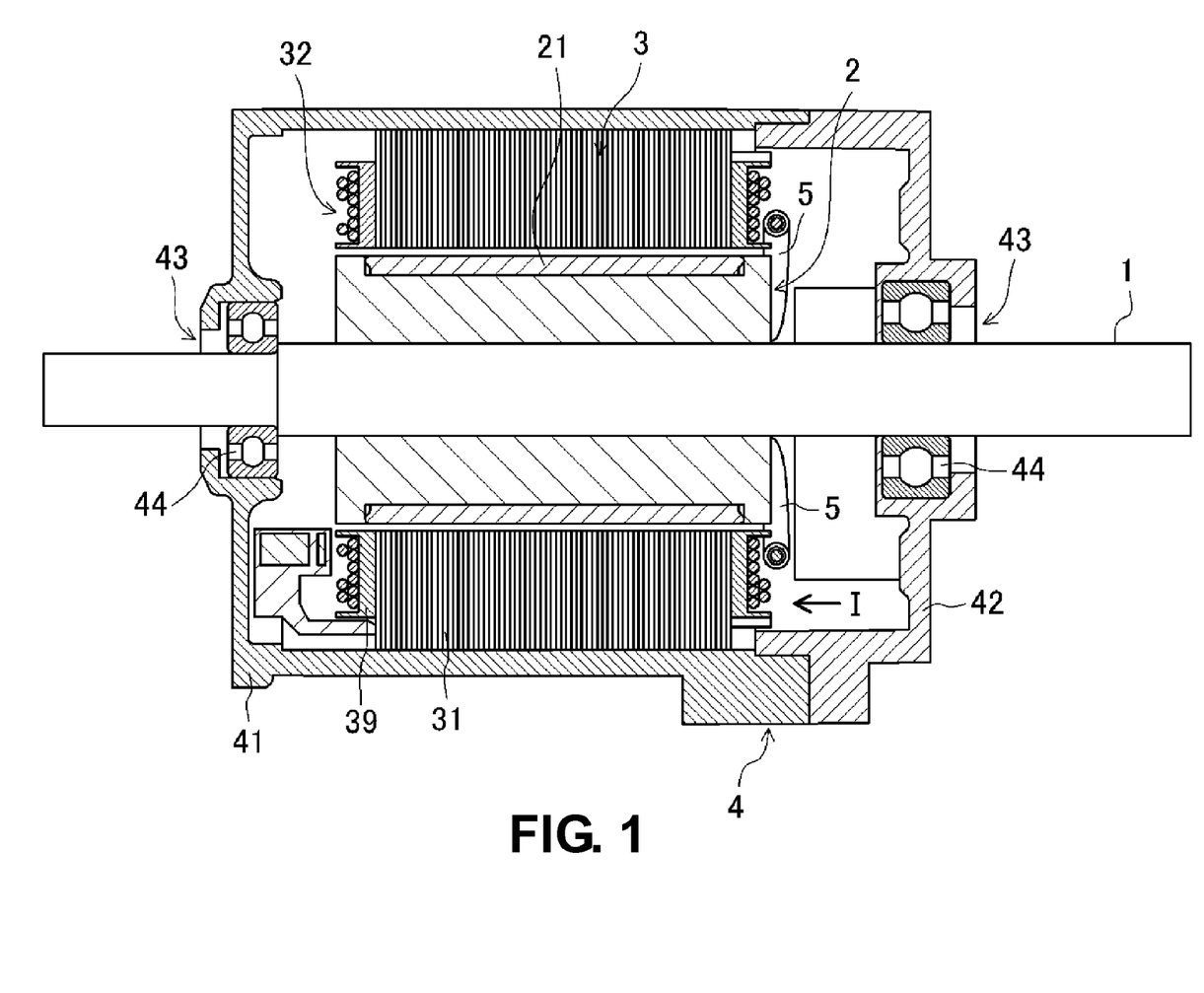
FIG. 1 is a schematic diagram of a cross-section of a motor according to a preferred embodiment of the present invention.
Figure 2:
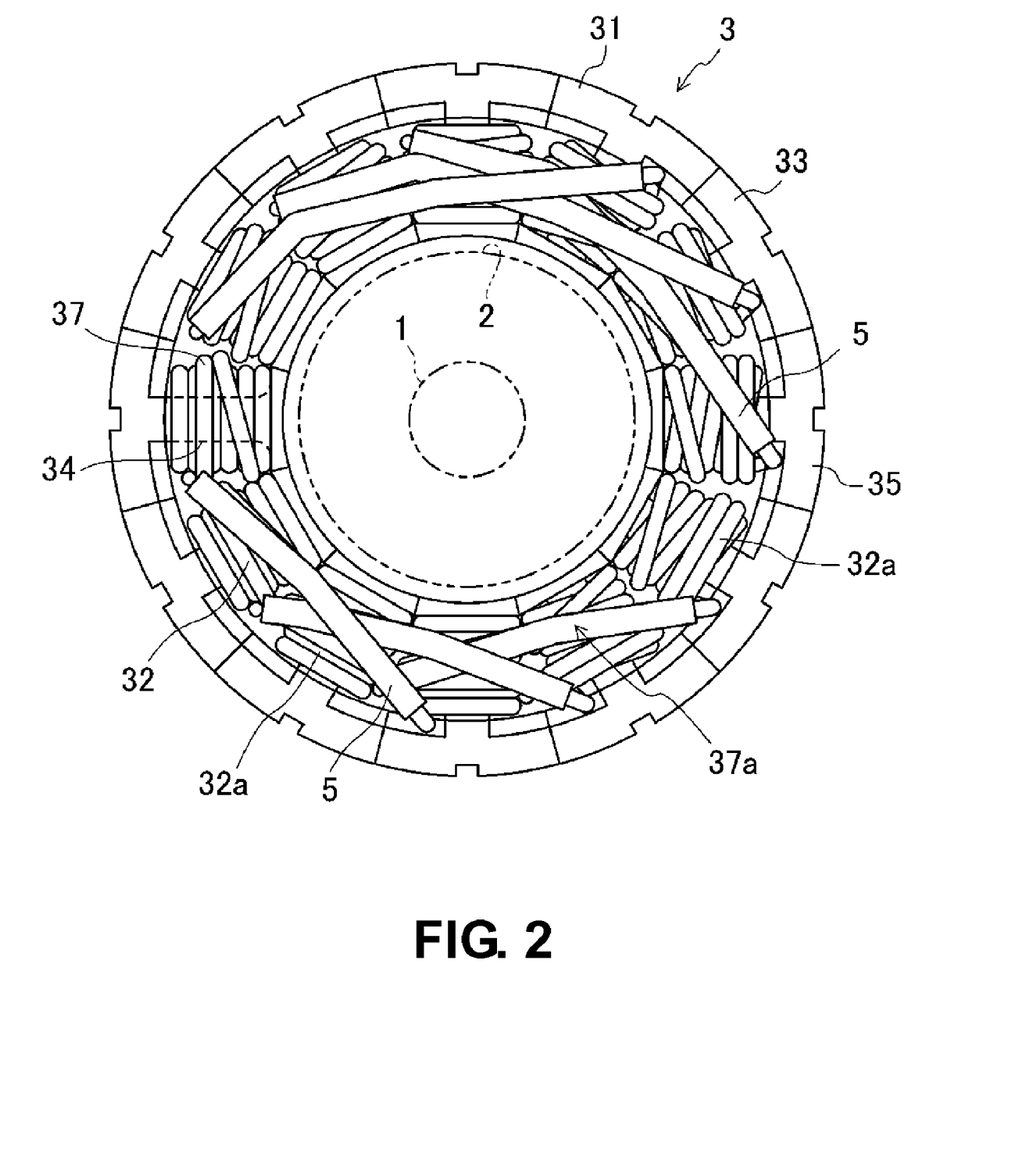
FIG. 2 is a schematic diagram of a stator of the motor when viewed from a direction indicated by arrow I in FIG. 1.

FIGS. 1 and 2 are schematic diagrams of a motor according to a preferred embodiment of the present invention. This motor preferably is a brushless motor that can be used, for example, as a driving source for an electric power steering system. The motor includes a shaft 1, a rotor 2, a stator 3, and a housing 4.

The housing 4 preferably includes a container-shaped bracket 41 and a lid-shaped cover 42. The bracket 41 is substantially tubular and includes a bottom. The cover 42 is arranged to be fitted to the bracket 41 to cover an opening of the bracket 41 so that the rotor 2 and the stator 3 are contained in the housing 4. A bottom surface of the bracket 41 includes a shaft opening 43 arranged at a substantial center thereof. A top surface of the cover 42, which is arranged to face the bottom surface of the bracket 41, also includes a shaft opening 43 arranged at a substantial center thereof. The shaft 1 is arranged to pass through the shaft openings 43, and supported by the housing 4 through bearings 44 such that the shaft 1 is rotatable with respect to the housing 4.

The rotor 2 is substantially cylindrical, and arranged to be fixed to an axially middle portion of the shaft 1 such that the rotor 2 is coaxial with the shaft 1. An outer circumferential surface of the rotor 2 has a plurality of magnets 21 arranged thereon such that north and south poles alternate with each other in a circumferential direction. The stator 3 is substantially tubular, and arranged to surround the rotor 2 with a slight air gap provided between an inner circumferential surface of the stator 3 and the outer circumferential surface of the rotor 2.

Referring to FIG. 2, the stator 3 includes a core 31, a plurality of (preferably twelve in the present preferred embodiment, for example) coils 32, and tubes 5. The core 31 includes a substantially tubular core base 33 and a plurality of (preferably twelve in the present preferred embodiment, for example) teeth 34 projecting from the core base 33 toward a center. The core 31 is defined by a combination of a plurality of (preferably twelve in the present preferred embodiment, for example) unit cores 35.

Figure 3:
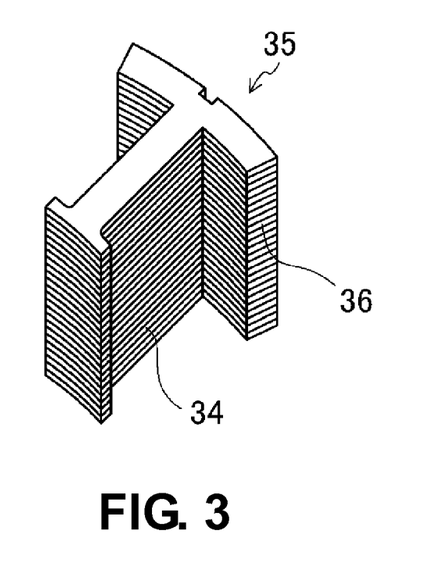
FIG. 3 is a schematic perspective view of a unit core according to a preferred embodiment of the present invention.

FIG. 3 is a schematic diagram of each of the unit cores 35. As illustrated in FIG. 3, the unit core 35 is defined by laminated metal sheets substantially in the shape of the letter "T" in a cross-section. The unit core 35 includes a unit core base 36, which defines a portion of the core base 33, and one of the teeth 34.

Figure 4:
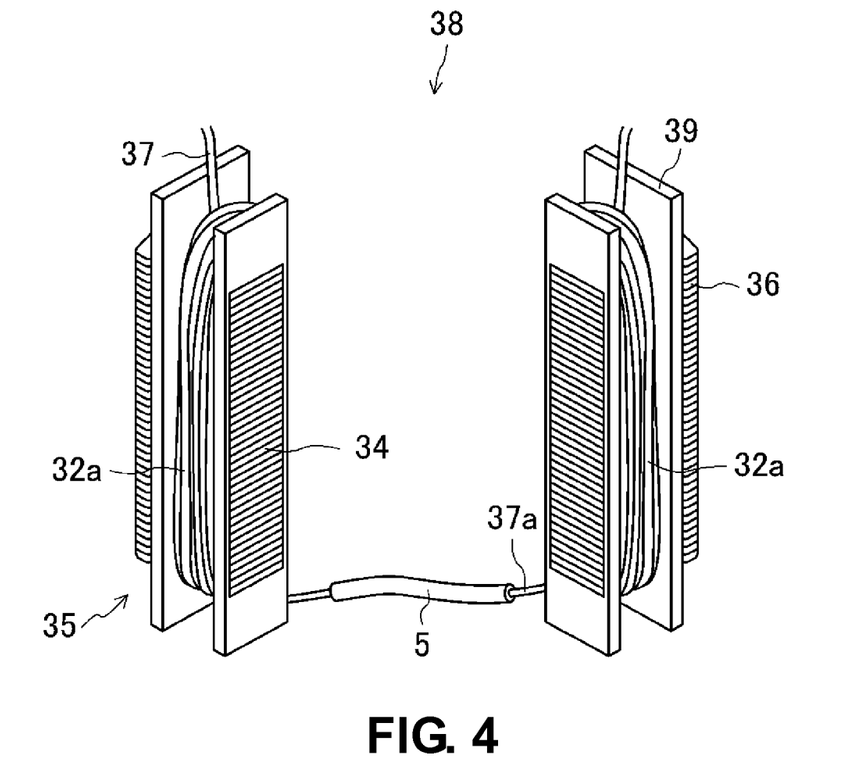
FIG. 4 is a schematic perspective view of a coil set according to a preferred embodiment of the present invention.

A conductor wire 37 is wound, preferably by using a concentrated winding method, around each of the teeth 34 with an electrically insulating insulator 39 placed between each tooth 34 and the conductor wire 37 to define the twelve coils 32. In the present preferred embodiment, the twelve coils 32 preferably include six coil sets 38. Referring to FIG. 4, each of the coil sets 38 preferably includes two of the coils 32 (continuous coils 32a) defined by a single line of the conductor wire 37. The details of the coil set 38 will be described below.

Each pair of the continuous coils 32a defined by a single line of the conductor wire 37 has, arranged therebetween in the circumferential direction, one of the continuous coils 32a constituting another one of the coil sets 38 and one of the continuous coils 32a constituting yet another one of the coil sets 38. Although not shown in the drawings, an end of the conductor wire 37 leading from each of the continuous coils 32a is arranged to be connected to a predetermined terminal of a busbar. For each of the coil sets 38, one of the tubes 5 is arranged to cover a portion (hereinafter referred to also as a "passage portion") 37a of the conductor wire 37 which passes from one of the continuous coils 32a to the other of the continuous coils 32a. In the present preferred embodiment, the number of tubes 5 is preferably six, for example.

Each of the tubes 5 is made, for example, of a soft material excellent in heat resistance and electrical insulation, such as a fluorocarbon polymer or glass fiber. It should be noted, however, that any other desirable material having acceptable heat resistance and electrical insulation properties could be used. The tube 5 is produced by, for example, common extrusion molding or by weaving glass fibers so that the tube 5 is continuous in its entirety. The tube 5 may have a break at an end portion thereof where insulation is not required, as long as the tube 5 does not have a break or a joint where insulation is required (a single-piece article). In the present preferred embodiment, the tube 5 is continuous in its entirety and arranged to cover a portion of the passage portion 37a where insulation is required.

The inside diameter of the tube 5 is greater than the outside diameter of the conductor wire 37 so that the conductor wire 37, when inserted through the tube 5, can move inside the tube 5 with little resistance. The tube 5 preferably has a length in the range of about 50 mm to about 100 mm, for example, but may be of any other appropriate length depending on the necessity.

Each tube 5 is preferably defined by a single body which is homogeneous and continuous in its entirety, and therefore never fails to prevent exposure of the corresponding passage portion 37a unless the tube 5 suffers an abrasion, a break, or the like. In addition, since the conductor wire 37 is arranged to pass inside the tube 5, the tube 5 is prevented from being removed from the conductor wire 37. Therefore, electrical insulation between each passage portion 37a and any other component is ensured with high reliability.

In the motor according to the present preferred embodiment, all the tubes 5 are arranged on one axial side of the stator 3, i.e., on one side along an axial direction of the shaft 1. More specifically, referring to FIG. 1, in the present preferred embodiment, all the tubes 5 are arranged on the side closer to the cover 42 of the housing 4 in order to prevent the tubes 5 from interfering with any other component of the motor.

When the tubes 5 are provided to cover the respective passage portions 37a, a required space to accommodate the tubes 5 may result in a corresponding increase in axial dimension of the stator 3. Accordingly, in order to prevent an increase in axial dimension of the stator 3, all the tubes 5 are arranged exclusively on one axial side of the stator 3 to achieve an efficient accommodation of the tubes 5.

Next, a method of manufacturing the motor according to the present preferred embodiment will now be described below. As described above, the stator 3 of the motor is defined by a combination of the six coil sets 38, each of which is formed by winding a single line of the conductor wire 37 around the tooth 34 of each of the two unit cores 35 continuously.

FIG. 4 illustrates one of the coil sets 38. When the coil set 38 according to the present preferred embodiment is formed, the conductor wire 37 is first wound, clockwise when viewed from the direction in which a tip of the tooth 34 faces, with a predetermined number of turns around the tooth 34 of one of the two unit cores 35, resulting in formation of the first one of the continuous coils 32a (hereinafter referred to as a "first continuous coil" 32a), and thereafter the conductor wire 37 is wound in a similar manner around the tooth 34 of the other unit core 35 such that the passage portion 37a is formed between the two continuous coils 32a, resulting in formation of the second one of the continuous coils 32a (hereinafter referred to as a "second continuous coil" 32a). The tube 5 is arranged at the passage portion 37a between the first and second continuous coils 32a.

A process of arranging the tube 5 around the passage portion 37a between the two continuous coils 32a is carried out during a winding process including steps 1) to 4) below.

Step 1): Attaching the two unit cores 35 to a winding machine such that the unit cores 35 are arranged side by side (a unit core supporting step).

Step 2): Inserting the conductor wire 37 drawn from a conductor wire feeding device 53 into the tube 5, starting with an end of the conductor wire 37, and temporarily supporting the tube 5 such that the conductor wire 37 is passable through the tube 5 (a tube supporting step).

Step 3): Winding the conductor wire 37 fed through the tube 5 around the tooth 34 of each of the two unit cores 35 to form the two continuous coils 32a continuously (a winding step).

Step 4): Feeding the tube 5 in the middle of forming the two continuous coils 32a during the winding step (a tube feeding step).

Figure 5:
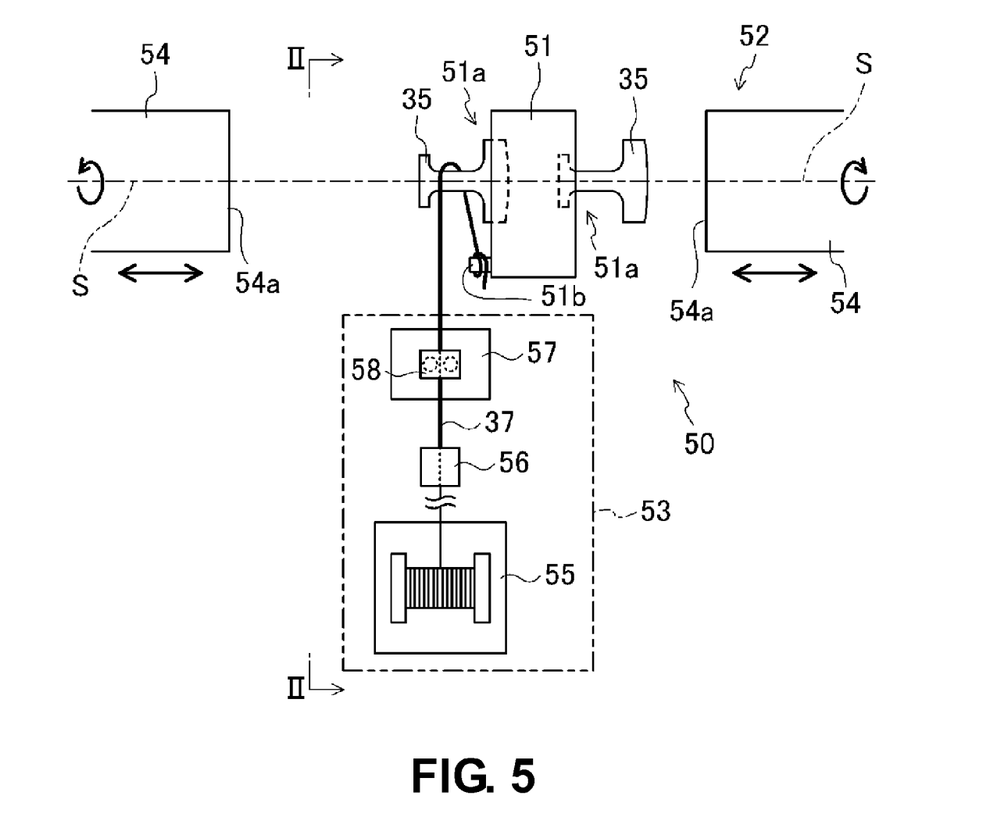
FIG. 5 is a schematic diagram of a winding system.
Figure 6:
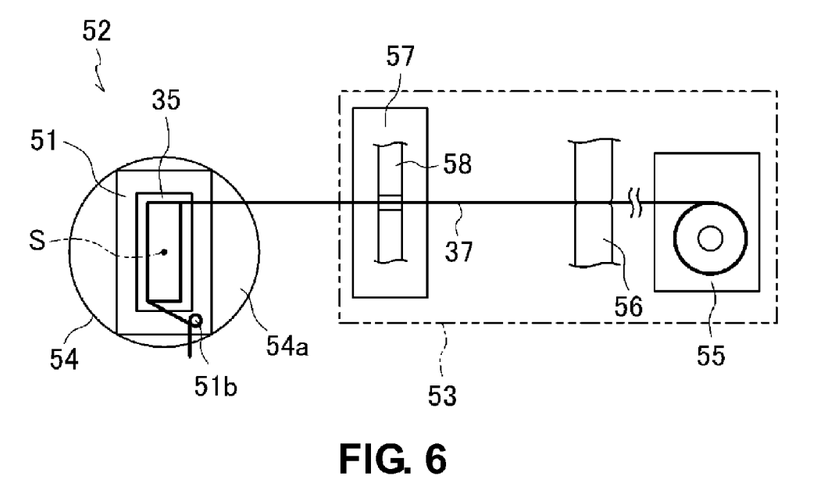
FIG. 6 is a schematic diagram of the winding system when viewed from a direction indicated by arrows II in FIG. 5.

FIGS. 5 and 6 illustrate a preferred winding system 50 used to perform the above-described steps. The preferred winding system 50 preferably includes a jig 51 used to support the two unit cores 35, a winding machine 52 used to support the unit cores 35 and control rotation of the unit cores 35 in conjunction with the jig 51, and the conductor wire feeding device 53 used to feed the conductor wire 37 in accordance with the rotation of the winding machine 52.

The jig 51 includes two mounting portions 51a to which the two unit cores 35 are mounted, respectively. The two unit cores 35 are attached to the jig 51 such that the unit cores 35 are arranged side by side and each of the teeth 34 is arranged on a rotation axis S. In addition, the jig 51 also includes a hook portion 51b to which an end of the conductor wire 37 is secured.

The winding machine 52 includes a pair of supporting shafts 54. Each of the supporting shafts 54 includes a support surface 54a at a top thereof, and the pair of supporting shafts are arranged such that the support surfaces 54a of the respective supporting shafts 54 face each other. It is possible to control the position of each supporting shaft 54 along the rotation axis S and also to control the rotation of each supporting shaft 54 about the rotation axis S.

The conductor wire feeding device 53 preferably includes a feeding mechanism 55 used to feed the conductor wire 37, a holding device 56 used to hold the conductor wire 37, and a tube feed control device 57 used to control the feeding of the tube 5. The feeding mechanism 55 is arranged to draw the conductor wire 37 from a reel around which the conductor wire 37 is wound, and feed the conductor wire 37 in conjunction with the winding machine 52.

Figure 7A:
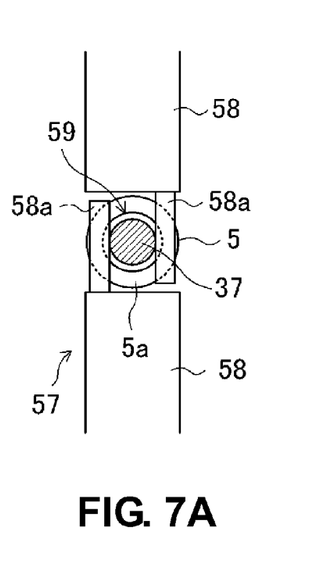
FIG. 7A is a schematic front view of tube blocking portions.
Figure 7B:
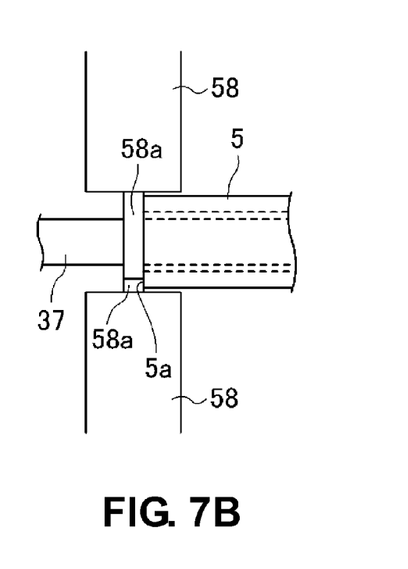
FIG. 7B is a schematic side view of the tube blocking portions.
Figure 8:
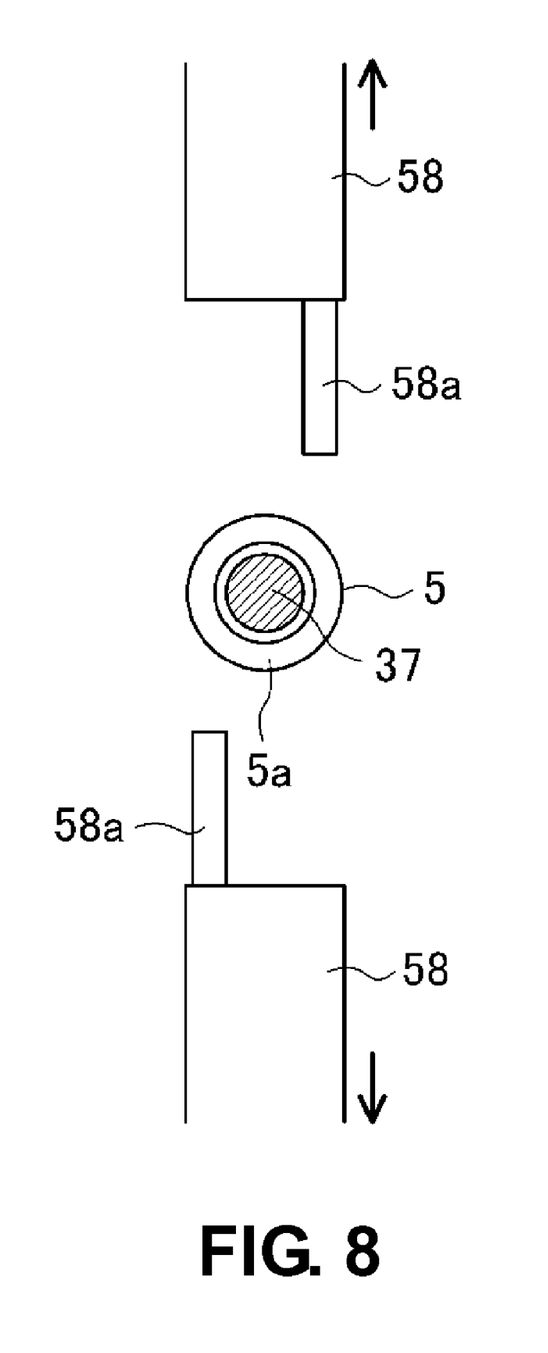
FIG. 8 is a schematic diagram of the tube blocking portions in a different situation from that of FIG. 7A.

FIGS. 7A, 7B, and 8 illustrate the tube feed control device 57. The tube feed control device 57 preferably includes a pair of tube blocking portions 58. Each of the tube blocking portions 58 preferably includes a pin 58a projecting from a top thereof. The two tube blocking portions 58 are arranged such that the tops thereof face each other. It is possible to control relative positions of the two tube blocking portions 58 such that the tube blocking portions 58 have a tube supporting positional relationship as illustrated in FIGS. 7A and 7B, where the tops of the tube blocking portions 58 are arranged close to each other, or a tube feeding positional relationship as illustrated in FIG. 8, where the tops of the tube blocking portions 58 are arranged far away from each other. When the tube blocking portions 58 have the tube supporting positional relationship, the two pins 58a are arranged close to each other with a small space (hereinafter referred to as a "passage opening") 59 therebetween which is wider than the outside diameter of the conductor wire 37 and narrower than the outside diameter of the tube 5. On the other hand, when the tube blocking portions 58 have the tube feeding positional relationship, the distance between the two pins 58a is controlled to prevent the tube 5 from coming into contact with either of the tube blocking portions 58.

Next, the above-described steps will now be described specifically below with reference to a case where one of the coil sets 38 is manufactured.

Figure 9:
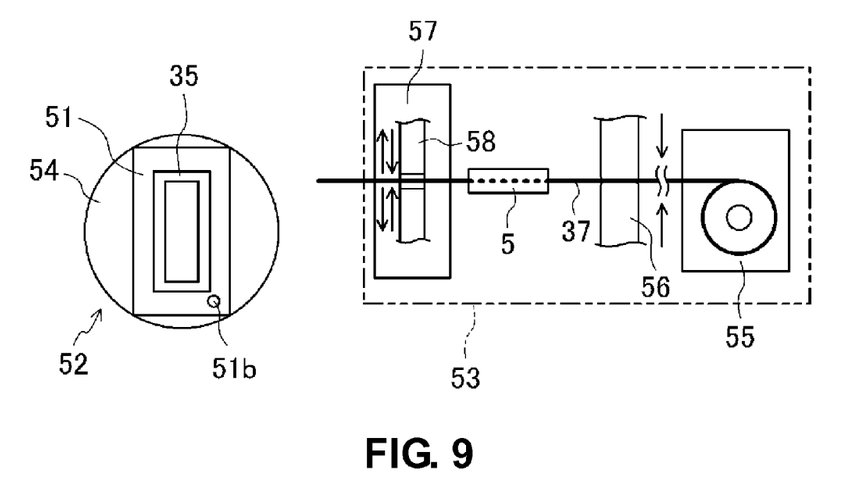
FIG. 9 is a diagram illustrating a step of a winding process.

Referring to FIG. 9, the conductor wire 37 is drawn from the conductor wire feeding device 53, and held by the holding device 56 to prevent the conductor wire 37 from slacking, and the conductor wire 37 is inserted into the tube 5, starting with the end of the conductor wire 37. While the two tube blocking portions 58 are arranged to have the tube feeding positional relationship, the tube 5 is fed to a position between the tube feed control device 57 and the holding device 56, and thereafter the two tube blocking portions 58 are arranged to have the tube supporting positional relationship (the tube supporting step). As illustrated in FIG. 7A, when the two tube blocking portions 58 have the tube supporting positional relationship, the conductor wire 37 is passable through the passage opening 59. Meanwhile, because the outside diameter of the tube 5 is greater than the width of the passage opening 59, the tube 5 is not passable through the passage opening 59 because of a contact of an end surface 5a of the tube 5 with the pins 58a.

Referring to FIG. 5, either prior or subsequent to the above process, the two unit cores 35 are attached to the jig 51, and thereafter the jig 51 and the two unit cores 35 are held between and thereby supported by the pair of supporting shafts 54 (the unit core supporting step).

Figure 10:
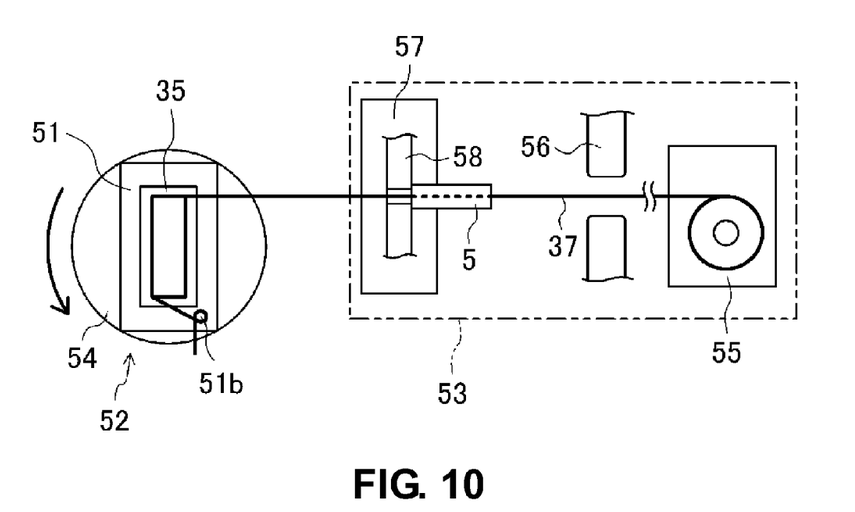
FIG. 10 is a diagram illustrating another step of the winding process.

Referring to FIGS. 5 and 10, next, the conductor wire 37 is drawn further, and an end portion of the conductor wire 37 is wound around the hook portion 51b of the jig 51 to be secured thereto. Here, it is possible to draw only the conductor wire 37 because the tube blocking portions 58 are arranged to support the tube 5 and thereby prevent the feeding of the tube 5. Moreover, because the inside diameter of the tube 5 is greater than the outside diameter of the conductor wire 37, and the pins 58a are arranged to receive only the end surface 5a of the tube 5, so that no superfluous external force is applied to the tube 5, it is possible to draw only the conductor wire 37 with little resistance.

Next, the winding machine 52 is driven to rotate the supporting shafts 54 so that the conductor wire 37 is automatically wound with the predetermined number of turns around the tooth 34 of one of the unit cores 35, resulting in the formation of the first continuous coil 32a (the winding step). At this time, the tube blocking portions 58 also together function as a nozzle to stabilize a position from which to feed the conductor wire 37.

Figure 11:
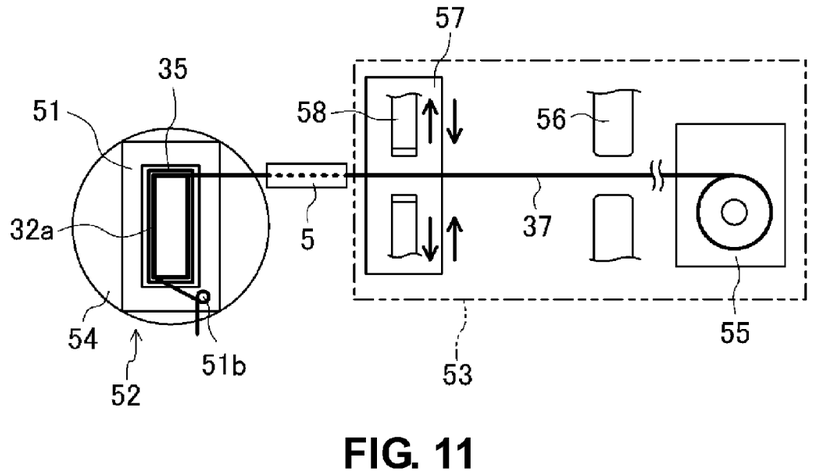
FIG. 11 is a diagram illustrating yet another step of the winding process.

Referring to FIG. 11, before the second continuous coil 32a is formed, the tube blocking portions 58 are relocated to have the tube feeding positional relationship. As a result, as illustrated in FIG. 8, both of the tube blocking portions 58 are moved away from the end surface 5a of the tube 5, so that the tube 5 is fed to a position in the vicinity of a winding end portion of the first continuous coil 32a (the tube feeding step). After the feeding of the tube 5, the tube blocking portions 58 are relocated to have the tube supporting positional relationship to function again as the nozzle.

Figure 12:
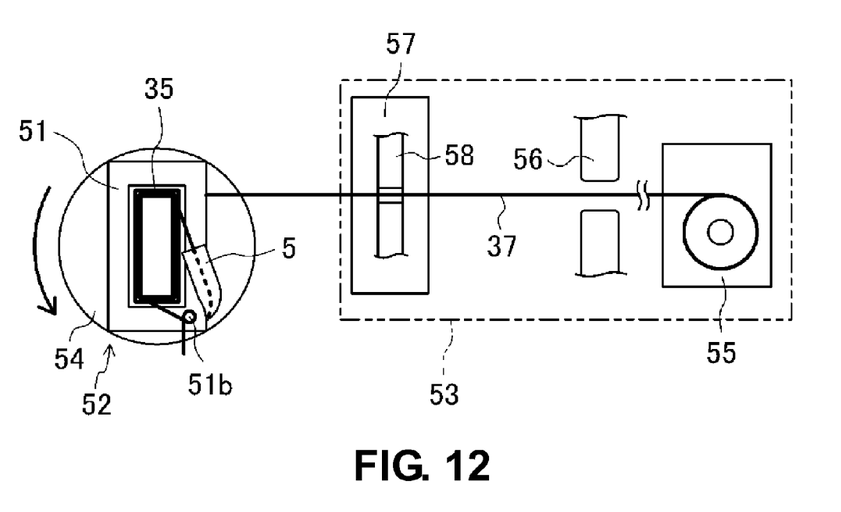
FIG. 12 is a diagram illustrating yet another step of the winding process.

Referring to FIG. 12, next, the conductor wire 37 is wound with the predetermined number of turns around the tooth 34 of the other unit core 35, resulting in the formation of the second continuous coil 32a (the winding step). After the formation of the second continuous coil 32a, the conductor wire is cut at a predetermined position between the second continuous coil 32a and the conductor wire feeding device 53, and the opposite end of the conductor wire 37 secured to the hook portion 51b is removed therefrom. The winding process including the above-described series of steps is now complete. Thereafter, the winding process may be repeated to manufacture a necessary number of coil sets 38. A description of other steps in a procedure of manufacturing the motor, such as a step of assembling the coil sets 38, is omitted.

As is clear from the foregoing description, it is easy to mass-produce motors according to the present preferred embodiment while ensuring electrical insulation at the passage portions 37a with high reliability.

Note that the present invention is not limited to the motor according to the above-described preferred embodiments and the method of manufacturing this motor, but that the present invention is also applicable to motors having various other structures and methods of manufacturing such motors.

Figure 13:
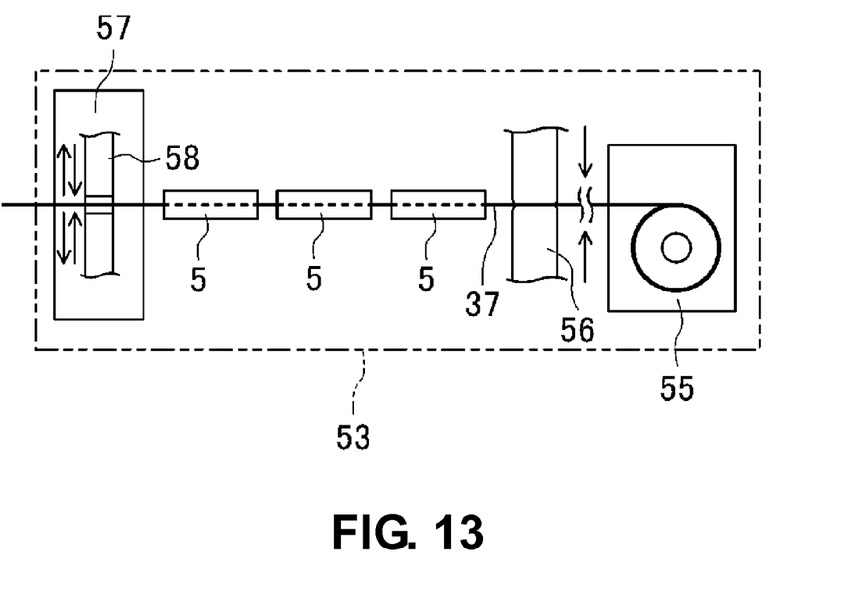
FIG. 13 is a diagram illustrating an example variation of the winding process.

For example, the number of unit cores 35 is not limited to twelve in other preferred embodiments of the present invention. Also, the number of continuous coils 32a defining the coil set 38 may be three or more in other preferred embodiments. In this case, the increased number of continuous coils 32a constituting the coil set 38 can be easily accomplished by using two or more jigs 51 and increasing the number of unit cores 35. In addition, referring to FIG. 13, it may be so arranged that two or more tubes 5 are fed to the position between the tube feed control device 57 and the holding device 56 in the tube supporting step, and that each of the tubes 5 is fed separately at an appropriate time in the tube feeding step.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A motor comprising:
   a shaft;
   a rotor fixed to the shaft;
   a tubular stator arranged to surround the rotor; and
   a housing arranged to contain the rotor and the stator and rotatably support the shaft; wherein
   the stator includes:
   a core including a plurality of teeth;

a plurality of coils each of which is defined by a conductor wire wound around a separate one of the plurality of teeth; and electrically insulating tubes;

the core is defined by a combination of a plurality of unit cores each of which includes a separate one of the plurality of teeth;

the plurality of coils include two or more continuous coils defined by a single line of the conductor wire;

each of the electrically insulating tubes is arranged to cover at least a portion of the conductor wire which passes between at least two of the continuous coils which are defined by the single line of the conductor wire; and at least one of the electrically insulating tubes is arranged to overlap a first one of the electrically insulating tubes and to also be overlapped by a second one of the electrically insulating tubes.

2. The motor according to claim 1, wherein the plurality of coils are defined by a concentrated winding.

3. The motor according to claim 1, wherein all of the electrically insulating tubes are arranged on one side of the stator.

4. The motor according to claim 1, wherein each of the electrically insulating tubes is continuous in its entirety.

5. A method of manufacturing the motor of claim 1, comprising the steps of:

a) attaching two or more of the plurality of unit cores to a winding machine;

b) inserting the conductor wire drawn from a conductor wire feeding device into one or more of the electrically insulating tubes, starting with an end of the conductor wire, and temporarily supporting the one or more electrically insulating tubes such that the conductor wire is passable through the one or more electrically insulating tubes; and c) winding the conductor wire fed through the one or more electrically insulating tubes around the tooth of each of the two or more of the plurality of unit cores to form the continuous coils continuously; wherein step c) includes d) feeding each of the one or more electrically insulating tubes in a middle of forming every two successive ones of the continuous coils.

6. The method according to claim 5, wherein the conductor wire feeding device includes a tube blocking portion operable to come into contact with an end surface of the electrically insulating tube having the conductor wire inserted therein;

in step b), the tube blocking portion is arranged to come into contact with the end surface of the electrically insulating tube to temporarily support the tube; and in step d), the tube blocking portion is moved away from the end surface of the electrically insulating tube to permit feeding of the tube.

7. The motor according to claim 1, wherein there are multiple sets of the plurality of coils including two or more continuous coils defined by a single line of the conductor wire and the conductor wire which passes between the two or more continuous coils, the conductor wire of each of the multiple sets of the plurality of coils is arranged to extend directly from a radially outer end of a first one of the plurality of coils to a radially outer end of a second one of the plurality of coils.

8. The motor of claim 1, wherein the plurality of coils including two or more continuous coils defined by a single line of the conductor wires are arranged such that the two or more continuous coils are disposed around respective ones of the plurality of teeth that are spaced apart from each other in a circumferential direction of the stator by at least two of the plurality of teeth arranged between the respective ones of the plurality of teeth.

* * * * *